United States Patent [19]

Najjar et al.

[11] Patent Number: 4,977,130

[45] Date of Patent: Dec. 11, 1990

[54] COMPOSITIONS INVOLVING $V_2O_3$-$AL_2O_3$-$TIO_2$

[75] Inventors: Nitri S. Najjar, Wappingers Falls, N.Y.; Arnulf Muan, Lacey Spring, Va.

[73] Assignee: Texaco Inc., White Plains, N.Y.

[21] Appl. No.: 402,714

[22] Filed: Sep. 5, 1989

[51] Int. Cl.$^5$ .......................... B01J 21/04; B01J 23/22
[52] U.S. Cl. ...................................... 502/351; 502/247; 502/248; 502/263; 502/319; 502/320; 502/324; 502/340; 502/341; 502/350; 502/354; 501/94; 423/593; 423/598; 423/600
[58] Field of Search ............... 502/351, 354, 525, 247, 502/248, 263, 319, 320, 324, 341; 423/327, 593; 501/94

[56] References Cited

U.S. PATENT DOCUMENTS

| | | | |
|---|---|---|---|
| 4,042,425 | 8/1977 | Ohashi et al. | 148/320 |
| 4,585,752 | 4/1986 | Ernest | 502/354 |
| 4,705,770 | 11/1987 | Cullu et al. | 502/351 |
| 4,797,381 | 1/1989 | Bartek et al. | 502/351 |

*Primary Examiner*—Anthony McFarlane
*Attorney, Agent, or Firm*—Robert A. Kulason; James J. O'Loughlin; Albert Brent

[57] ABSTRACT

A novel oxidation catalyst or refractory and the method for its preparation. The material comprises substitutional solid solutions involving $V_2O_3$, $Al_2O_3$ and $TiO_2$ and having compositions that fall within a specific polygon in a ternary composition diagram of $V_2O_3$, $Al_2O_3$ and $TiO_2$. A typical material has the formula $Al_{0.65}V_{1.7}Ti_{0.69}O_5$.

14 Claims, 1 Drawing Sheet

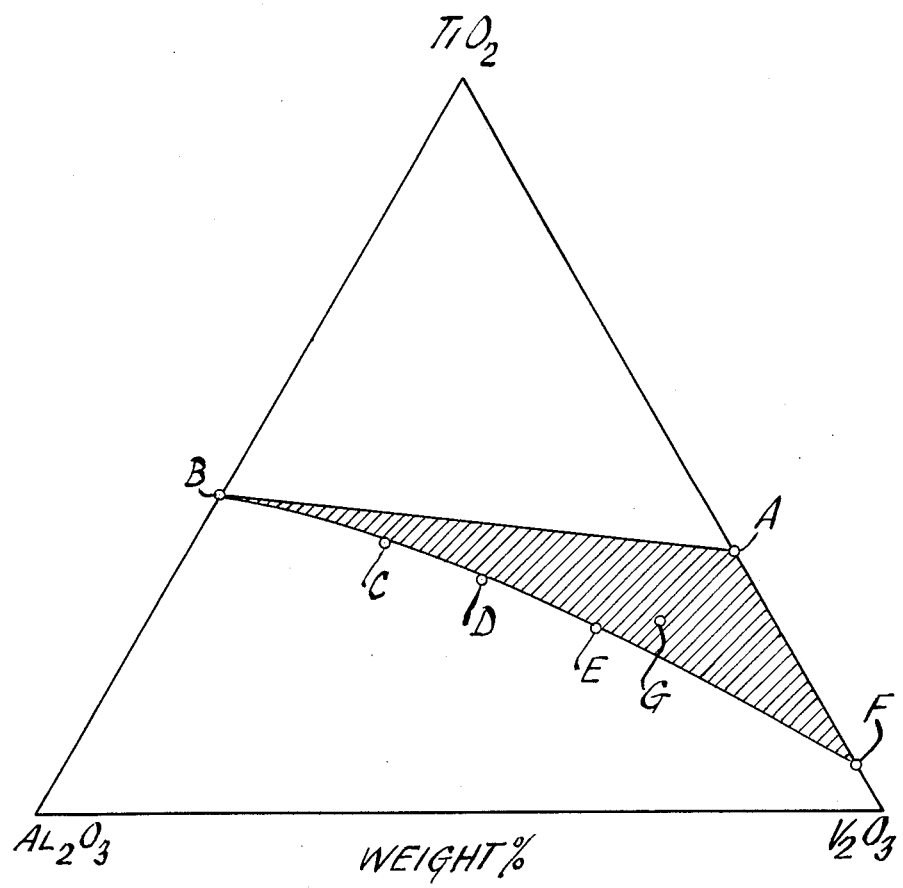

4,977,130

COMPOSITIONS INVOLVING $V_2O_3$-$Al_2O_3$-$TiO_2$

BACKGROUND OF THE INVENTION

1. Field of the Invention

This invention relates to substitutional compositions involving $V_2O_3$-$Al_2O_3$-$TiO_2$.

2. Description of the Prior Art.

Phases involving the oxides of aluminum, titanium, and vanadium have been synthesized previously only under the relatively oxidizing conditions of air (partial pressure of $O_2 = 0.2$ atmosphere). Under such conditions essentially all the vanadium is present in the pentavalent state ($V^{5+}$). The liquidus and solidus temperatures of such materials are relatively low (less than 690° C. for some mixtures). In comparison, the liquidus and solidus temperatures for the subject solid solutions involving $V_2O_3$-$Al_2O_3$-$TiO_2$ is at least 1000° C.

SUMMARY OF THE INVENTION

The present invention pertains to a novel oxidation catalyst and the method for its preparation. The material comprises substitutional solid solutions involving $V_2O_3$, $Al_2O_3$ and $TiO_2$ and having compositions that fall within a polygon in a ternary composition diagram of $V_2O_3$, $Al_2O_3$ and $TiO_2$ as described in the drawing herein; wherein the polygon has the vertices and corresponding coordinates in weight percent as shown in Table I.

TABLE I

| Vertices | Coordinates (wt %) | | |
|---|---|---|---|
| | $V_2O_3$ | $Al_2O_3$ | $TiO_2$ |
| A | 65 | 0 | 35 |
| B | 0 | 56 | 44 |
| C | 15 | 45 | 40 |
| D | 28 | 37 | 35 |
| E | 53 | 22 | 25 |
| F | 94 | 0 | 6 |

The substitutional solid solutions involving $V_2O_3$, $Al_2O_3$ and $TiO_2$ having compositions falling within the polygon shaped shaded area in the ternary composition diagram of V2O3, $Al_2O_3$ and $TiO_2$ as shown in the drawing are made by the process comprising the steps of:

(1) heating $V_2O_5$ powder having a particle size of less than about 50 microns in an atmosphere in which the partial pressure of oxygen is in the range of $10^{-8}$ to $10^{-10}$ atmosphere and the $CO_2/H_2$ volume ratio is in the range of about 10/1 to 1/1 while gradually increasing the temperature stepwise over a temperature range of about 600° C. to 1300° C. and holding the final temperature for a period of at least about 24 hrs. to ensure complete reduction of all vanadium to $V^{3+}$;

(2) heating $TiO_2$ and $Al_2O_3$ powders each having a particle size of less than about 50 microns for a period of about 10 to 14 hrs. at a temperature in the range of about 600° C. to 800° C. for $TiO_2$ and about 1000° C. to 1200° C. for $Al_2O_3$;

(3) thoroughly grinding together about 30 to 80 wt.% of $V_2O_3$ from (1), with about 15 to 40 wt.% of $TiO_2$ and about 5 to 30 wt.% of $Al_2O_3$ from (2) to produce a mixture having a grain size of less than about 50 microns, (4) pelletizing the mixture from (3) at a pressure of about 5,000 psi; and (5) heating the pellets from (4) at a temperature in the range of about 1100° C. to 1600° C. for a period in the range of about 12 to 48 hrs. in an atmosphere in which the partial pressure of oxygen is in the range of $10^{-10}$ to $10^{-5}$ atmosphere to produce said solid solution involving $V_2O_3$, $Al_2O_3$ and $TiO_2$.

In one embodiment, the pellets from step (5) are cooled to ambient temperature while at substantially the same partial pressure of oxygen as in step (5). Preferably, to prevent undue oxidation and moisture pickup, the cooled pellets are stored in a sealed container.

BRIEF DESCRIPTION OF THE DRAWING

The drawing depicts a ternary composition diagram showing a polygon within which useful substitutional solid solutions involving $V_2O_3$-$Al_2O_3$-$TiO_2$ are found.

DESCRIPTION OF THE INVENTION

New solid solutions have been synthesized by the subject invention in which the nature and extent of the formation of substitutional solid solutions involving vanadium oxide, notably $V_2O_3$ as a component have been characterized. This work has led to synthesizing new phases in which vanadium in several oxidation states are accommodated such as to render crystalline phases thermodynamically stable over a wide range of oxygen pressures at elevated temperatures.

The newly synthesized substitutional solid solutions in the $V_2O_3$-$Al_2O_3$-$TiO_2$ system are shown as falling within the polygon shaped shaded area in the ternary composition diagram in the drawing. The oxidation states of vanadium in the substitutional solid solutions are mainly +3 and +4. The polygon has the following vertices and corresponding coordinates in weight percent:

| Vertices | Coordinates (wt %) | | |
|---|---|---|---|
| | $V_2O_3$ | $Al_2O_3$ | $TiO_2$ |
| A | 65 | 0 | 35 |
| B | 0 | 56 | 44 |
| C | 15 | 45 | 40 |
| D | 28 | 37 | 35 |
| E | 53 | 22 | 25 |
| F | 94 | 0 | 6 |

A typical newly synthesized solid solution having the formula $Al_{0.65}V_{1.77}Ti_{0.69}O_5$ is illustrated by point G in the drawing having the following coordinates in wt.%: $V_2O_3$ 60, $Al_2O_3$ 15, and $TiO_2$ 25.

Ternary compounds in the $V_2O_3$-$Al_2O_3$-$TiO_2$ system are synthesized in the following manner: First, $V_2O_3$ is prepared by heating commercially available analytical-grade $V_2O_5$ having a particle size of less than about 50 microns in a vertical tube furnace in an atmosphere of carefully selected oxygen pressure within the stability range of $V_2O_3$ e.g. in the range of $10^{-8}$ to $10^{-10}$ atmospheres. This is accomplished by using a gas mixture of high-purity $CO_2$ and $H_2$ in controlled proportions. The $CO_2/H_2$ ratio by volume is in the range of 10/1 to 1/1. The relatively low melting point of the starting vanadium oxide ($V_2O_5$), e.g. about 690° C., necessitates heating the oxide slowly. Starting at a temperature of about 600° C., the temperature is gradually increased stepwise over a period of about 12 to 24 hrs. to a final temperature of about 1300° C. At that temperature the oxide is held at least about 24 hrs. e.g. 24 to 30 hrs. to ensure complete reduction of all vanadium to $V^{3+}$ ($V_2O_3$). The identity of the reaction product, substitutional solid solutions involving $V_2O_3$-$Al_2O_3$-$TiO_2$, may be confirmed by X-ray diffraction analysis.

Pre-heated analytical-grade oxides having a particle size of less than about 50 microns are used as starting materials for the other components of the solid solutions to be synthesized. For example, $TiO_2$ is heated for about 10 to 14 hrs. at a temperature in the range of about 600° C. to 800° C. and $Al_2O_3$ is heated for about 10 to 14 hrs. at a temperature in the range of about 1000° C. to 1200° C. prior to being used in preparation of the final mixtures.

The mixtures of the three oxide components are mechanically ground together under acetone in an agate mortar to ensure thorough mixing and a sufficiently small grain size e.g. less than 50 microns. For example, about 30 to 80 wt.% of $V_2O_3$ is ground together with about 15 to 40 wt.% of $TiO_2$ and about 5 to 30 wt.% of $Al_2O_3$ to produce a mixture having a grain size of less than about 50 microns. Complete formation of the desired compounds in the succeeding heat treatment is thereby promoted. Next, the oxide mixtures are pelletized at a pressure of about 5,000 psi or higher. The pellets may have any conventional size e.g. 1/16" to 1". The pellets are then heated at a temperature in the range of about 1100° C. to 1600° C. for a period in the range of about 12 to 48 hrs. (depending on the nature and solidus temperature of the phase to be synthesized) in a vertical tube furnace with carefully controlled oxygen pressures, in the range of $10^{-10}$ to $10^{-5}$ atmosphere. In the manner described previously for preparing $V_2O_3$, the pellets are heated in a furnace atmosphere provided by a gas mixture of $CO_2$ and $H_2$ in various desired mixing ratios, typically in the range of about 10/1 to 1/1. These selected ratios are kept constant for the duration of the synthesis by use of a differential manometer. By this method the oxygen pressure at the specified temperature can be controlled to better than ± 1%. The thermodynamic data for the water-gas reaction ($CO_2 + H_2 = CO + H_2O$), on which the calculations were based, are known with extremely high accuracy (better than 0.1%), and hence the method used ensures reliable accurate control of the oxidation state of vanadium during the synthesis. This is extremely important for optimization of the properties of the finished product.

In addition to oxygen pressure, one other parameter influencing the oxidation state of vanadium in oxide phases has been utilized in synthesizing the new phases, viz. the provision of host structures which incorporate vanadium in one (or more) valence state(s) in strong preference to other valence states. In the present case, the extensive ternary solid solution phases of pseudobrookite type structure in the system $V_2O_3$-$Al_2O_3$-$TiO_2$ serves this purpose. In these solid solutions the vanadium is present partly in the trivalent state, as stabilized by the preferential substitution of $V^{3+}$ for $Al^{3+}$, and partly in the tetravalent state, as stabilized by the preferential substitution of $V^{4+}$ for $Ti^{4+}$. Furthermore, $Al_2O_3$ in combination with vanadium oxide stabilizes $V^{5+}$ in the crystalline phase $AlVO_4$ by virtue of the fact that $Al_2O_3$ is a base relative to $V_2O_5$.

The pellets of the substitutional solid solutions involving $V_2O_3$-$Al_2O_3$-$TiO_2$ may be used as an oxidation catalyst, offering improved activity and yields and greater stability over a wider temperature range e.g. about 1000° C. or higher than that which is offered by typical oxidation catalysts. For example, as an oxidation catalyst the subject pellets may be used in the conversion of o-xylene to phthalic anhydride, butene to maleic anhydride, or alcohols to aldehydes or organic acids.

As a high temperature refractory or as an ingredient in a high temperature refractory material for lining a gasifier for the partial oxidation of ash-containing liquid hydrocarbonaceous and solid carbonaceous fuels, the subject material would have a long life, withstanding attack from $V_2O_5$. For example, a thermal refractory for lining the reaction zone of a partial oxidation gas generator may comprise the previously described solid solution involving $V_2O_3$-$Al_2O_3$-$TiO_2$ in the amount of about 1 to 25 wt.%, and the remainder comprising at least one metallic oxide with the metal portion being selected from the group consisting of Cr, Mg, Al, Mn, Si, and mixtures thereof.

The subject solid solution involving $V_2O_3$-$Al_2O_3$-$TiO_2$ may also be used as an additive. About 0.01 to 0.2 wt.% (basis weight of ash in the fuel feed) of the additive may be introduced into the refractory lined partial oxidation gas generator along with the fuel feed to stabilize said refractory.

Various modifications of the invention as herein before set forth may be made without departing from the spirit and scope thereof, and therefore, only such limitations should be made as are indicated in the appended claims.

We claim:

1. A composition involving $V_2O_3$, $Al_2O_3$ and $TiO_2$ wherein said composition is depicted by the shaded area circumscribed by AFEDCB as shown in the disclosed figure wherein the amounts of $V_2O_3$, $Al_2O_3$ and $TiO_2$ are characterized as shown in the table below:

| Vertices | Coordinates (Wt %) | | |
| --- | --- | --- | --- |
|  | $V_2O_3$ | $Al_2O_3$ | $TiO_2$ |
| A | 65 | 0 | 35 |
| B | 0 | 56 | 44 |
| C | 15 | 45 | 40 |
| D | 28 | 37 | 35 |
| E | 53 | 22 | 25 |
| F | 94 | 0 | 6. |

2. A composition as provided in claim 1 having the formula $Al_{0.65}V_{1.77}Ti_{0.69}O_5$ as illustrated by point G in the said disclosed figure and having the following coordinates in wt.%: $V_2O_3$ 60, $Al_2O_3$ 15 and $TiO_2$ 25.

3. A composition as provided in claim 2 wherein said vanadium is present in the trivalent and tetravalent states.

4. A composition as provided in claim 2 having a structure comprising pseudobrookite.

5. A method of preparing compositions involving $V_2O_3$, $Al_2O_3$ and $TiO_2$ that fall within a polygon shaped area in a ternary composition diagram of $V_2O_3$, $Al_2O_3$ and $TiO_2$ comprising the steps of
   (1) heating $V_2O_5$ powder having a particle size of less than about 50 microns in an atmosphere in which the partial pressure of oxygen is in the range of $10^{-8}$ to $10^{-10}$ atmospheres while gradually increasing the temperature stepwise over a temperature range of about 600° C. to 1300° C. and holding the temperature at about 1300° C. for a period to ensure complete reduction of all vanadium to $V^{3+}$;
   (2) separately heating $TiO_2$ and $Al_2O_3$ powders each having a particle size of less than about 50 microns for a period of about 10 to 14 hrs. at a temperature in the range of about 600° C. to 800° C. for $TiO_2$ and about 1000° C. to 1200° C. for $Al_2O_3$;

(3) thoroughly grinding together about 30 to 80 wt.% of $V_2O_3$ from (1), with about 15 to 40 wt.% of $TiO_2$ and about 5 to 30 wt.% of $Al_2O_3$ from (2) to produce a mixture having a grain size of less than about 50 microns, (4) pelletizing the mixture from (3) at a pressure of about 5,000 psi; and (5) heating the pellets from (4) at a temperature in the range of about 1100° C. to 1600° C. for a period in the range of about 12 to 48 hrs. in an atmosphere in which the partial pressure of oxygen is in the range of $10^{-10}$ to $10^{-5}$ atmosphere.

6. The method of claim 5 provided with the steps of cooling the pellets from (5) to ambient temperature, while at substantially the same partial pressure of oxygen as in (5); and storing the cooled pellets in a sealed container.

7. The method of claim 5 where in step (1) said $V_2O_5$ powder is heated in an atmosphere comprising a gas mixture of $CO_2$ and $H_2$ with a volume ratio of $CO_2/H_2$ in the range of about 10/1 to 1/1.

8. The method of claim 5 where in step (5) said pellets are heated in an atmosphere comprising a gas mixture of $CO_2$ and $H_2$ with a volume ratio of $CO_2/H_2$ in the range of about 10/1 to 1/1.

9. The method of claim 5 wherein said compositions involving $V_2O_3$, $Al_2O_3$ and $TiO_2$ are depicted by the shaded area circumscribed by AFEDCB as shown in the disclosed figure wherein the amounts of $V_2O_3$, $Al_2O_3$ and $TiO_2$ are characterized as shown in the table below:

| Vertices | Coordinates (Wt %) | | |
|---|---|---|---|
| | $V_2O_3$ | $Al_2O_3$ | $TiO_2$ |
| A | 65 | 0 | 35 |
| B | 0 | 56 | 44 |
| C | 15 | 45 | 40 |
| D | 28 | 37 | 35 |
| E | 53 | 22 | 25 |
| F | 94 | 0 | 6 |

10. The method of claim 9 wherein said composition has the formula $Al_{0.65} V_{1.77} Ti_{0.69} O_5$ as illustrated by point G in the disclosed figure and having the following coordinates in wt.%: $V_2O_3$ 60, $Al_2O_3$ 15 and $TiO_2$ 25.

11. The method of claim 9 wherein said composition has a structure of the pseudobrookite.

12. The method of claim 9 wherein said compositions involving $V_2O_3$, $Al_2O_3$ and $TiO_2$ are used to produce a thermal refractory for lining the reaction zone of a partial oxidation gas generator, wherein said refractory comprises said compositions in the amount of about 1 to 25 wt.% and the remainder of the refractory comprising at least one oxide having a cationic portion selected from the group consisting of Cr, Mg, Mn, Si, Al, and mixtures thereof.

13. A thermal refractory composition for lining the reaction zone of a partial oxidation gas generator, wherein said composition involves $V_2O_3$, $Al_2O_3$ and $TiO_2$ and falls within the shaded area circumscribed by AFEDCB as shown in the disclosed Figure wherein the amounts of $V_2O_3$, $Al_2O_3$ and $TiO_2$ are characterized as shown in the table below:

| Vertices | Coordinates (Wt %) | | |
|---|---|---|---|
| | $V_2O_3$ | $Al_2O_3$ | $TiO_2$ |
| A | 65 | 0 | 35 |
| B | 0 | 56 | 44 |
| C | 15 | 45 | 40 |
| D | 28 | 37 | 35 |
| E | 53 | 22 | 25 |
| F | 94 | 0 | 6, | and wherein said composition is present in said refractory in the amount of about 1 to 25 wt%, and the remainder of said refractory comprises at least one oxide having a cationic portion selected from the group consisting of Cr, Mg, Mn, Si, Al, and mixtures thereof.

14. An oxidation catalyst involving $V_2O_3$, $Al_2O_3$ and $TiO_2$ wherein said oxidation catalyst is depicted by the shaded area circumscribed by AFEDCB as shown in the disclosed Figure wherein the amounts of $V_2O_3$, $Al_2O_3$ and $TiO_2$ are characterized as shown in the table below:

| Vertices | Coordinates (Wt %) | | |
|---|---|---|---|
| | $V_2O_3$ | $Al_2O_3$ | $TiO_2$ |
| A | 65 | 0 | 35 |
| B | 0 | 56 | 44 |
| C | 15 | 45 | 40 |
| D | 28 | 37 | 35 |
| E | 53 | 22 | 25 |
| F | 94 | 0 | 6. |

* * * * *